UNITED STATES PATENT OFFICE.

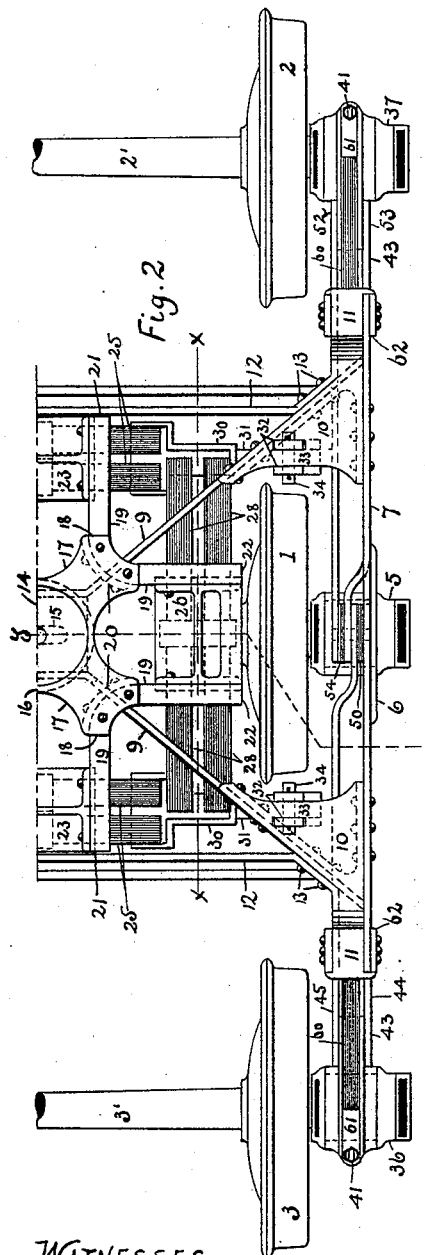
(No Model.)
L. T. PYOTT.
TRUCK FOR RAILWAY CARS.
No. 582,435. Patented May 11, 1897.
WITNESSES.
INVENTOR
Louis T. Pyott
By R. C. Wright
attorney

LOUIS T. PYOTT, OF PHILADELPHIA, PENNSYLVANIA.

TRUCK FOR RAILWAY-CARS.

SPECIFICATION forming part of Letters Patent No. 582,435, dated May 11, 1897.

Application filed October 15, 1896. Serial No. 608,917. (No model.)

*To all whom it may concern:*

Be it known that I, LOUIS T. PYOTT, a citizen of the United States, residing at Philadelphia, in the county of Philadelphia and State of Pennsylvania, have invented certain new and useful Improvements in Six-Wheeled Trucks for Railway-Cars; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in trucks for railway-cars having six wheels to each truck; and my purpose is to make a truck wholly of metal, in shapes easily made or obtained, and I also reduce the weight of the truck over those heretofore constructed, while decreasing the number of parts, providing means for the easy removal of wheels and axles, a large number of springs for easy riding, and produce a truck adapted to carry the heaviest cars on steam-railroads, and also specially adapted to cars propelled by electric motors for the reason that with my truck the motor may readily be removed, when necessary, without removing the truck from under the car, thus saving time and expense. The parts of my truck are more readily inspected than in the usual truck, being more readily seen, thus affording additional safety. I attain these objects by the mechanism illustrated in the accompanying drawings, in which—

Figure 1 is a side elevation. Fig. 2 is a top view. Fig. 3 is a section on line $x\,x$, Fig. 2. Fig. 4 is a section on line $y\,y$, Fig. 2.

Similar reference-characters refer to similar parts throughout the views.

My truck has a middle pair of wheels 1 and two outer pairs of wheels 2 3. The middle pair have an axle 4, supported in journal-boxes 5 by the usual bearings and guided by pedestals 6, secured to the truck side frames 7 by bolts 8 in the usual manner, except that my truck side frames 7 are of metal, whereas the usual practice is to make the truck side frames of wood, or of wood metal-plated, and it is also usual to provide side frames long enough to attach three pedestals to each side frame, or three pairs of pedestals for the three pairs of wheels, whereas I use pedestals for only the central pair of wheels and use a shorter side frame, for the reasons hereinafter set forth. The central pair of wheels will be narrower over the flanges, or have more gage-play, as is usual in six-wheel trucks, and for the same purpose—ease in passing curves.

My side frames 7 are tied to each other by the diagonal braces 9, which are secured to the side frames 7 by brackets 10, to which they are riveted, and the brackets 10 are also riveted to the side frames 7. The brackets 10 extend out to the ends of the side frames 7 and form heads 11. To the heads 11 are secured cross-braces 12, formed at their outer ends to run parallel to frames 7, then diagonally to attach to braces 9 and brackets 10, to which they are riveted at 13, and they then extend across to the opposite side frame, where they are similarly formed and attached. The diagonal braces 9 are united at their center by a tie 14, to which they are riveted, and a slotted hole 15 is made for the king-bolt to pass through. The diagonal braces 9 and cross-braces 12 are of less depth than the side frames 7 to enable the bolster, to be hereinafter described, to lie above them and to rest upon them as safety-supports in the event of the failure of the bolster-supports.

A center plate 16 is placed at the center of the truck, and above the diagonal braces 9 and their tie 14. The center plate 16 has outward projections 17, carrying flanges 18, which rest upon bolster-beams 19, and flanges 20, which are riveted to beams 19. Flanges 18 are also riveted to beams 19. The beams 19 are four in number, being bent at right angles, one leg 21 extending longitudinally with the center line of the truck and the other leg 22 extending transversely outward from the center. The bolster-beams 19 are shown as made of channel-bars, but other forms of beam-sections may be used. This is also true of the side frames 7, which are shown of rectangular section, but a channel-bar can as readily be adapted to this use, especially in heavy trucks for heavy cars. At the outer ends 21 of bolster-beams 19 they are secured to each other by brackets 23, having underneath spring-pockets 24, in which are seated springs 25. At the ends 22 of bolster-beams 19 are brackets 26, having spring-pockets 27 underneath, in which are seated springs 28, and at the upper side are side bearings 29. Thus it will be seen that the bolster is in the form of a cross, having transverse and longitudinal arms reaching out both longitudinally and transversely each way from the center of the truck and having springs underneath for its support, both longitudinal and transverse.

The bolster-springs 25 28 rest at their ends in double spring-pockets 30, supported by and resting upon swing-beams 31, suspended by links 32, the links 32 being suspended from brackets 10 by means of ears 33, made thereon, pins 34 passing through ears 33 and links 32, and pins 35 passing through swing-beams 31 and links 32. By these means the weight of the car and its load received by the center plate 16 is transferred to the outer ends of the side frames 7 and the truck is free to move transversely under the car, as well as to revolve around its king-bolt.

The outer wheels 2 3, by their axles 2' 3' and the usual bearings, are carried in axle-boxes 36 37, secured in open-ended yokes 38 39, each yoke having its outer end opening closed by a filling-piece 40, through which is inserted an eyebolt 41, the eyes 42 forming a means for attaching safety-chains.

The open-ended yoke 38 is secured to an equalizing-beam 43, composed of two rectangular section-bars 44 45, which are secured by rivets 46 to each side of neck 47 of yoke 38. The bars 44 45 are formed to reach upward at their inner ends and pass over a plate 49, resting upon the top of the central axle-box 5. The bar 44 is straight throughout its entire length, as seen in Fig. 2, while bar 45, as seen in the same figure, is turned and bent toward bar 44, and both bars are secured to an inserted piece 50, which has upon its lower edge a semicircular notch 51, embracing a projection on plate 49, made to receive it. By this construction the bars 44 45 and inserted piece 50 occupy but half the transverse space on top of axle-box 5. The open-ended yoke 39 is similarly attached to bars 52 53, the bar 53 being turned in, as seen from Fig. 2, and with bar 52 embracing an inserted piece 54, which locks over the projection on plate 49. The bars 44 45 are also united by a block 55, inserted between them and riveted to them and at its upper part forming a spring-seat 56. Bars 52 53 have a block 57, having a spring-seat 58. It will be seen that by this construction wheels 2 3 are free to move up and down independently of wheels 1, while at the same time being secured at a predetermined distance therefrom.

It has been shown how the weight of the car and its load is carried by the bolster-springs and therefrom transferred to the side frames, and its further transmission to the wheels is as follows: Brackets 10 have formed within their lower side spring-pockets 59. Into these are inserted semielliptic equalizing-springs 60, the inner ends of the springs reaching and being seated in spring-pockets 56 58, and their outer ends reaching and being seated in pockets 61, formed in the upper sides of the open-ended yokes 38 39 and directly over the axle-boxes 36 37, so that as the wheels roll along the track and meet any elevation or depression the shock is transmitted by beams 44 45 or 52 53, as the case may be, to springs 60, thus causing the beams to become and to act as equalizers to ease wheels 1 2 3 over any inequality of elevation or depression.

The side frames 7 may be made of any desired length to throw the proportion of weight desired upon the end wheels 2 3 and center wheels 1, the greater weight being desired upon the outer wheels more especially when they are driven by motors directly attached, as in the case of electric cars. Depending from the side frames 7, brackets 10, and braces 12, and secured to heads 11 are suspension-yokes 62, they being made preferably of rectangular section-bars, bent in U shape and riveted to each side of heads 11. To the lower part of each suspension-yoke inner ties 63 and outer ties 64 are secured. These ties are rectangular section-bars and pass inward to the pedestals 6, to which they are secured, and a pedestal-tie 65 has one end between the ties 63 64 at each outer side of the legs of pedestals 6, reaching across under the axle-boxes 5, thus tying the whole lower structure from 62 on one end to 62 on the other end, while permitting the removal of axle-boxes 5 and wheels 1 and their axles. Between bars 63 64 blocks 66 are secured, and to these blocks 66 are attached cross-ties 67. These ties effectually check any tendency of the wheel-flanges to laterally deflect suspension-yokes 62, and in electric-motor trucks are also utilized as motor-supports. On either side of 62 62 and attached to 44 45 and 52 53 are stops 68 69, the stops 68 68 abutting the inside of suspension-yokes 62 to overcome any tendency of wheels 2 3 and attached parts to be carried outward, and 69 69, abutting the outside, overcome any tendency to go toward the center, and being curved upon their abutting faces the free movement of beams 44 45 and 52 53 radially from axle-boxes 5 is not obstructed.

To remove a pair of wheels 2 or 3, it is only necessary to take out bolt 41 and piece 40. This is a very desirable feature, as these wheels carry about two-thirds of the total weight and need renewing oftener than the central wheels, and when carrying electric motors it is a cheap and quick way to renew a defective motor by at once rolling out the wheels and the attached motor and replacing them with a perfect motor already attached to a pair of wheels adapted to go into the same place.

The equalizing-beams of my truck may be of comparatively light construction, as only one half the total weight comes upon the equalizing-beams, the other half being transferred direct to the top of the outer axle-boxes 36 37. My side frames also receive their weight at their strongest and best-supported portions and at the points directly supported by the wheels, the equalizing-beams, and their springs.

I reserve the right to the use of pressed steel or other shaped sections of frames, beams, braces, and such parts as could be more advantageously used when trucks of stronger construction are required, as to use such in my general form would be clearly within my invention.

Six-wheeled trucks are acknowledged as being the best form for safety, easy riding, and heavy loads, but their adoption for motor-driven trucks has not been heretofore possible or advantageous, as the present known construction would not permit the attachment of the electric motors.

I claim—

1. In six-wheeled trucks for railway-cars, wheels, axles, bearings and axle-boxes for the same, the central pair of axle-boxes being guided and held by pedestals secured to side frames the side frames being of a less length than from center to center of the outer axles, transverse diagonal braces from the side frame of one side to the side frame of the other side, a central tie for the diagonal braces, corner-brackets attached to the side frames, and cross-braces secured to the corner-brackets and diagonal braces, substantially as described.

2. In a six-wheeled truck, side frames of a less length than the distance between the centers of the outer pairs of wheels, pedestals upon the side frames for guiding the central pair of wheels, means to brace the ends of the side frames diagonally from the center of the truck, means to tie the ends of the side to each other across the truck, the diagonal and cross bracing being of less depth than the side frames to which they are joined, means to tie the diagonal braces to each other at the center of the truck, and means to unite the diagonal and cross bracing to the side frames, substantially as and for the purposes set forth.

3. In six-wheel trucks, side frames shorter than the distance between the centers of the outer wheels, a single pair of pedestals upon the side frames, means to unite the side frames to each other by diagonal braces from near their ends to the center of the truck and to tie the diagonal braces to each other at their center, means to tie the side frames to each other by right-angle braces, and means upon the connections of the side frames to the braces aforesaid to support links and thereby swing-beams, at each side of the central axle, substantially as set forth.

4. In six-wheel trucks, side frames having thereon and thereto attached a single pair of pedestals, means to tie the side frames to each other by direct and by diverging braces, means to support swing-links and swing-beams by said side frames and braces, and spring-seats mounted on and carried by said swing-beams, substantially as set forth and described.

5. In six-wheeled trucks side frames carrying a single pair of pedestals and extending therefrom toward outer pairs of wheels but to a less distance than their centers, means to diagonally and transversely brace and tie the side frames to each other, means to support swing-links and swing-beams, and spring-seats mounted upon the swing-beams each seat adapted to receive longitudinal and transverse springs, substantially as described.

6. In six-wheel trucks, side frames carrying a single pair of pedestals, means to tie the side frames to each other by ties and braces substantially as described, means to support swing-links, swing-beams having spring-seats adapted to receive both longitudinal and transverse springs, springs resting therein at their ends and at their center supported in seats beneath a four-armed bolster, substantially as described.

7. In a six-wheeled truck a center plate therefor seated upon and secured to a bolster having double arms extending transversely and longitudinally each way from said center plate, means to tie each transverse and longitudinal arm of the bolster to its fellow, seats thereon wherein to rest yielding mechanism connecting the bolster to swing-beams supported by a frame mechanism composed of side frames carrying a single pair of pedestals and braced and cross-braced substantially as set forth.

8. In a six-wheeled truck, a central bolster therefor having a center plate and constructed to be seated upon transverse and longitudinal springs, swing-beams on which to rest the springs, having seats thereon and adapted therefor, means to support and swing the beams from a structure having side frames carrying a single pair of pedestals and transversely and diagonally braced and tied substantially as described, corner-brackets joined to the side frames and cross and diagonal braces and forming means with the side frames for attaching suspension-yokes thereto, and suspension-yokes depending from said side frames, substantially as set forth.

9. In a six-wheeled truck, a frame structure composed of side frames carrying a single pair of pedestals and braced and tied to each other substantially as set forth, swing-beams supported from said structure and by means of springs seated thereon supporting a swing-bolster from four points, but above the means to brace and tie the side frames to each other, suspension-yokes secured to and depending from the side frames, and means to secure and tie each lower end of the suspension-yokes to the central pedestals, substantially as described.

10. In a six-wheeled truck, a frame structure composed of side frames, a single pair of pedestals attached thereto, means substantially as described to unite the side frames by diagonal and cross braces and ties of less depth than the side frames, swing-beams and means for their support, yielding means upon the swing-beams for supporting a bolster both longitudinally and transversely, a center plate secured to the swing-bolster, suspension-yokes attached to and depending from the side frames, and double ties from and attached to the suspension-yokes and reaching and secured to the central pedestals, substantially as described.

11. In a six-wheeled truck, a framework having side pieces supported diagonally and transversely to each other and carrying a single pedestal on each, means for swinging a central bolster therefrom yieldingly supported both longitudinally and transversely, suspension-yokes depending from the side frames, means to tie the suspension-yokes to the pedestals, means to attach the suspension-yoke ties of one side of the pedestals to those of the other side, under the central axle-boxes, and means to secure the suspension-yoke ties of one side of the truck to those of the other side and thereon support a motor, substantially as set forth.

12. In a six-wheeled truck, side frames braced and tied to each other, a swing-bolster and means for its support, a single pair of pedestals upon the side frames and guiding the axle-boxes of a single pair of wheels centrally in the truck, equalizing-beams resting upon the central pair of axle-boxes and thereafter passing longitudinally outward therefrom, each way, and at their outer ends having means for attaching the axle-boxes of the two outer pairs of wheels, substantially as and for the purposes set forth.

13. In a six-wheeled truck, side frames braced and tied to each other, a swing-bolster and means for its support, a single pair of pedestals, one being on each side frame and guiding a single pair of wheels centrally in the truck, equalizing-beams composed of two members resting on the central pair of axle-boxes and thereafter passing outward therefrom, each way, and at their outer ends having means for removably securing the axle-boxes of the two outer pairs of wheels, substantially as set forth.

14. In a six-wheeled truck, side frames braced and tied to each other, a swing-bolster and means for its support, a single pair of pedestals secured to the side frames and guiding the axle-boxes of a single pair of wheels, a plate upon each axle-box, a transverse projection upon the plate, equalizing-beams resting upon the plate and engaging the projection and thereafter reaching outward and having means at their outer ends for removably securing the axle-boxes of the outer pairs of wheels by a single bolt, substantially as described.

15. In a six-wheeled truck, side frames bearing a single pair of pedestals and braced and stayed transversely substantially as set forth, swing-beams and means for their support, a bolster and means for its support, suspension-yokes depending from and secured to the side frames, means to tie the yokes to the pedestals and transversely, and equalizing-beams resting upon the central pair of axle-boxes, guided by the suspension-yokes, and carrying at their outer ends axle-boxes removably attached, substantially as and for the purposes described.

16. In a six-wheeled truck, side frames having a single pair of pedestals attached thereto, means to secure the side frames rigidly to each other, swing-beams and means for supporting them, a bolster and means for its yielding support, means from the side frames to guide equalizing-beams resting upon the central pair of axle-boxes and thereafter extending outward and carrying the axle-boxes of the outer pairs of wheels, seats under the means securing the side frames to their braces, a seat upon the equalizing-beams near their inner end, a seat over the outer axle-boxes, and springs having their centers seated at the side frame, one end seated upon the seats on the equalizing-beams, and the other end seated over the outer axle-boxes, substantially as set forth.

17. In a six-wheeled truck side frames having one pair of pedestals secured thereto, means to secure the side frames to each other, a bolster and means to seat it for yielding, means to swing the bolster transversely, axle-boxes in the pedestals, equalizing-beams seated thereon composed of two longitudinal members, reaching outward each way from the pedestal, one member of each equalizing-beam being straight as viewed from its top, and one member being curved toward the straight member and united thereto by an intermediate and notched piece, a guide from the side frames for the equalizing-beams, means upon the beams to abut each edge of the guides, yielding mechanism between the equalizing-beams and the side frames, and axle-boxes removably attached to the outer ends of the equalizing-beams, substantially as described.

In testimony whereof I affix my signature in presence of two witnesses.

LOUIS T. PYOTT.

Witnesses:
R. C. WRIGHT,
WILLIAM C. STOEVER.